US007004532B2

(12) United States Patent
Cartella

(10) Patent No.: US 7,004,532 B2
(45) Date of Patent: Feb. 28, 2006

(54) STRUCTURE FOR THE FRONT OF A VEHICLE, OF THE TYPE WITH CONTROL OF THE DEFORMATION FOR THE SAFEGUARD OF THE PEDESTRIAN

(75) Inventor: Pietro Cartella, Casalborgone (IT)

(73) Assignee: Plastal SpA, Pordenone (IT)

( * ) Notice: Subject to any disclaimer, the term of this patent is extended or adjusted under 35 U.S.C. 154(b) by 0 days.

(21) Appl. No.: 10/658,784

(22) Filed: Sep. 9, 2003

(65) Prior Publication Data

US 2004/0080180 A1 Apr. 29, 2004

(30) Foreign Application Priority Data

Sep. 9, 2002 (IT) .......................... TV2002A0103

(51) Int. Cl.
*B60R 27/00* (2006.01)

(52) U.S. Cl. .......................... 296/187.04; 296/187.09; 296/203.02; 180/69.2

(58) Field of Classification Search ........... 296/187.04, 296/187.09, 203.02; 280/735, 762; 180/69.2, 180/274
See application file for complete search history.

(56) References Cited

U.S. PATENT DOCUMENTS

| | | | | |
|---|---|---|---|---|
| 3,784,244 | A | 1/1974 | Emi | |
| 4,249,632 | A * | 2/1981 | Lucchini et al. | 180/274 |
| 6,329,910 | B1 | 12/2001 | Farrington | |
| 6,386,623 | B1 * | 5/2002 | Ryan et al. | 296/187.04 |
| 6,712,169 | B1 * | 3/2004 | Ryan et al. | 180/274 |
| 2002/0166707 | A1 * | 11/2002 | Palenchar et al. | 180/69.21 |
| 2003/0213635 | A1 * | 11/2003 | Ryan et al | 180/274 |

FOREIGN PATENT DOCUMENTS

| | | |
|---|---|---|
| DE | 19806153 | 8/1999 |
| DE | 19934141 | 2/2001 |
| DE | 10031525 | 1/2002 |
| EP | 1046546 | 10/2000 |
| GB | 2368565 | 5/2002 |
| WO | WO 01/28818 | 4/2001 |
| WO | WO 01/98117 | 12/2001 |
| WO | WO 02/055343 | 7/2002 |

* cited by examiner

*Primary Examiner*—Lori L. Coletta
(74) *Attorney, Agent, or Firm*—Egbert Law Offices

(57) ABSTRACT

Structure for the front of a vehicle, of the type with deformation control for the safeguarding of pedestrians, cooperating with a sensor to detect approaching or actual impacts and including at least one air bag placed below the front bonnet component, and the front part of the vehicle having a "soft nose" shape The structure includes at least a frontal interchangeable pre-assembled module, made of a thermoplastic material that includes the motor bonnet covering, the bumper covering and the covering of the mudguards, respectively left and right, the pre-assembled module, in correspondence with the front side, is hinged underneath the front of the vehicle, and where at least on one side is deformable or capable of being raised by air bags placed under the module interacting with the sensor, while maintaining the rear portion coupled.

9 Claims, 3 Drawing Sheets

STRUCTURE FOR THE FRONT OF A VEHICLE, OF THE TYPE WITH CONTROL OF THE DEFORMATION FOR THE SAFEGUARD OF THE PEDESTRIAN

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The main object of this invention is an interchangeable pre-assembled module made from a thermoplastic material with the purpose of reducing the injuries inflicted upon the vulnerable users of the road.

BACKGROUND OF THE INVENTION

The innovation may be used especially, but not exclusively, in the field of vehicles to allow, by means of an ensemble of suitable solutions, a reasonable adaptation to the legislations that are provided in order to safeguard pedestrians.

Among the most recently debated arguments by the EuroNCAP crash test program, arose the need to make automobiles less aggressive towards pedestrians. Since time, there are many Companies in the sector working in this sense, especially by means of modifications to the body of the vehicle, the bonnet and front bumpers, according to the solutions adopted by the manufacturers to provide even more protection for the passengers and the cabin.

In the Applicant's Country it has been estimated that each year more than 16000 pedestrians are injured following a collision with a car, with an average of about 35 pedestrians each day, an alarming figure even if on the other hand it is a common data within all the other Countries with a high motorization rate.

More recent observations regarding the phenomenon have established the contributions of enterprises in the sector, all aimed towards to development of passive safety within accidents between vehicles and pedestrians, as significant. Progress has been made in the reduction of leg wounds, in particular among children, due to the rounder front of modern cars, so as to the absence of protrusive headlights. The windscreen and front fittings, for their natural rigidity, are still considered the points that pose the highest risk of serious or fatal head injuries among adults. The EuroNCAP Crash Test confirms, in addition, that no car fully satisfies the test related to femur and pelvis injuries, and this is a significant evaluation considering that in 80% of frontal collision cases the pedestrian is hit sideways on.

1. State of the Art

The problem of the safeguard or of the reduction of impact related injuries on pedestrians, involving cars, has been apparent since at least 1974. In fact in U.S. Pat. No. 3,784,244 (Emi) a structure was already foreseen, elastically pliable, placed as a transverse barrier regarding the car and to be fitted frontally almost behind the bumper. Subsequently, there have been numerous applications aimed at cushioning a collision with a pedestrian. The first applications, for example, like GB2368565 (Moore), intended on intervening directly on the front bumpers of the car, providing a dependent or independent part of it, such as an underlying bumper, able to yield axially, receding in order to cushion the collision, in case the same part is in contact with the obstacle. Another significant intervention has affected the conformation of the front bumpers of the car. EP 1 046546 (Mark), in order to reduce the injuries inflicted on pedestrians, has proposed a bumper which, ideally, is shaped with a protruding lower portion, with regards to the upper portion, in such a way that the thickness decreases from the bottom upwards. According to this solution, the applicant intends, in case of collision, to concentrate the force of impact in the underside of the bumpers. The concept generally expressed in the mentioned patent is re-proposed in a certain number of previous and later proposals, which suggest different solutions for presenting the lower part of the bumper, corresponding for example to the spoiler, as a functional part in case of impact with the pedestrian. JP1 8155699 (Iwamoto, et al.), observes that it is essential, in order to cause the least damage possible to the pedestrian, to construct in correspondence with the front part of the car namely the joining of the single elements that form it, radiator-bonnet bumpers-grid, an inclined surface with of about 15°–30° towards the rear part. This causes the pedestrian to be hit first on the legs and then as an effect of kinetic energy, laid out on his/her chest on the bonnet of the car, a condition that would have the aim of cushioning the blow. The condition proposed in this industrial patent is attainable, by providing a controlled recession of the upper part of the bumper, greater than the lower part. Also DE1 9934141 (Leng) and WO 01/28818 (Staines, et al.), suggest a similar solution, differing from the previous one by the fact that it foresees the part underneath the bumper, corresponding to the spoiler, placed slightly behind. In that way, a solution better known with the definition "soft nose", in the case of collision with a pedestrian, the vertical surface of impact appears to be slightly increased, considerably improving the effect on the typology of injuries.

To contribute best to the additional reduction of impacts and above all to the seriousness of injuries, the electronics also concurred. The aim of the invention according to WO 01/98117 (Mattes) is to determine with a certain precision when the pedestrian causes the frontal collision of the vehicle. There are two decisive conditions that should happen to consider the collision with the pedestrian accepted. The first decisive condition comes about by comparing measured deformation pressures through a sensor applied to the front bumpers, and a sensor in the front part of the bonnet with typical information for a collision with a pedestrian. The second decisive condition comes about by comparing variations of speed and/or acceleration caused by the collision with reference to typical data of a collision with a pedestrian. Sensors are also described in GB 0101298.8 (Ashmead). In more detail, it suggests a control system in close correlation with the data of the speed of the car. The comparing of said data, with an average value, determines the activation of a system that stiffens or softens the resistance to the deformation of the front bumpers.

Also well known are the air bags applied in correspondence with the front part of the car. For example DE 10031525(Sinnhuber) provides a collapsible air bag, placed in proximity of the spoiler, which in the eventuality, is filled up with the gas that is contained in the chamber built in to the upper bumper. Air bags are also described in WO 02/55337 (Hammer, et to the.) and WO 02/055343 (Curry, et al.). In both cases, it concerns an air bag that, other than having more independent chambers, is laid on top of the front bumpers and goes along the majority of the width of the front of the car.

And also known is to provide air bags that cooperate with sensors, so much of the ultrasound type that they detect the presence of an obstacle, as described in DE 19806153 (Niggeman), as of the type with more complex detection arrangements, that keep account of different parameters, such as the vehicle's speed, in turn to be elaborated as that described in U.S. Ser. No. 08/850,363 (Gabbard). Interesting, finally, is the suggestion contained in U.S. Pat. No. 6,329,910 (Farrington), in which a sensor, placed along the front bumpers, for the protection of the pedestrian, is aimed at unfurling an air bag or the bonnet of the car.

2. State of the Art Most Similar to the Invention

JP 2173499 (Toshiyuki, et al.) describes a device for safeguarding pedestrians from a frontal impact with a motor vehicle, providing an air bag placed between the front part of a front bumper and the rear part of a bonnet, said air bag unfurls on the outside of the car body affecting the front part of the car, and in particular the part immediately above the bumpers. In this case, sensors that detect, or detect in anticipation, the presence of the obstacle, determine the activation of the air bag. The aim of the proposal is the prevision of an air bag which, in order to cushion the impact, will have a surface of high rigidity placed on the side affected by the collision. This surface is joined to the cover of the air bag, and may also be joined to a small amount of the body of the car, as for example the portion of the front grid, to convey the cooling air flows of the radiator.

Lastly, there is U.S. Pat. No. 4,249,632 (Lucchini). It proposes a device to protect the pedestrians involved in a collision with a vehicle. Said device consists of a mechanism to raise the rear part of the bonnet. Said mechanism can be activated by a sensor installed in the front zone of the bumpers, which detects the collision with the pedestrian. When the collision is detected, the mechanism proceeds to raise the bonnet from a rest position to a position of impact, a condition that according to the applicant has the purpose of reducing the potential contact between the head of the pedestrian and the windscreen. Among the possible solutions of mechanisms aimed at raising the rear part of the bonnet, is also mentioned an air bag, the cover of which is kept deflated in the part immediately under the rear part of the bonnet.

3. Drawbacks

According to the applicant these initiatives, also valuable in the aim, appear to offer little resolution to the problem.

More in particular, in solutions that only adopt the passive shape of the front part of the car, according to a so-called "soft nose" configuration, as for example DE19934141 (Leng) and WO 01/28818 (Staines, et al.) the main problem remains, however, that the energy created by the impact is not absorbed in a sufficient manner so as to reduce the range of injuries. In some cases, it is redistributed more uniformly with regards to other solutions, while for other proposals the energy originated by the impact is concentrated only locally, as in the case of the solutions providing a pronounced lip, elastically yielding, fitted below the bumpers.

With regards to the sensors, for example those described in GB 0101298.8 (Ashmead) or other mechanical or electronic detection systems such as WO 01/98117 (Mattes), which detect an approaching or an actual event, certainly proved to be helpful. They, however, do not appear to be optimized in an overall context as a device for the safeguard of the pedestrian from collisions, equipped with an ensemble of interacting solutions aimed at reducing the injuries. This is because, generally, said sensors are not by themselves sufficient, but it is in the opinion of the applicant that they have to cooperate, other than with shapes of the front part of the vehicle opportunely devised to reduce the impact, with other afore-mentioned proposals like those that foresee the aid of the air bag.

Relative to the solutions that suggest the use of an air bag, as in DE 10031525 (Sinnhuber), also cooperating with the action of sensors, as the case of U.S. Pat. No. 6,329,910 (Farrington), modifications to the front part of the vehicle are not mentioned, nor on a structural level, nor on the shape of the front part, therefore it is considered that the traditional series of components are substantially maintained. It is a fact therefore, that this circumstance does not allow to optimize the main function of the air bag, that as it is well known should be aimed at preventing violent impacts between the pedestrian and the vehicle.

With regards to the solution described in JP2173499 (Toshiyuki, et al.) it is observed that the air bag, during the impact, unfolds itself in a manner that only affects the front part of the vehicle, leaving the position of the bonnet unchanged. This proposal, also valuable, seems to not to prevent to pedestrian from being struck violently on to the surface of the bonnet of the vehicle, where, when laying on it, there is no active solution to cushion the collision.

In U.S. Pat. No.4,249,632 (Lucchini), that seems to be more significant than others with regards to the aim of the assessment of the requirements of this invention, the air bag modifies, after the impact, the position of the bonnet. In this hypothesis only the bonnet is raised, leaving the position of the bumpers and also of the front lateral part of the car body unchanged. This circumstance does not allow, as the previous solutions, to cushion the collision in a sufficient manner. In more detail, the problem seems more apparent in that only one air bag placed under the bonnet is present, in the part closest to the windscreen. The main purpose of this proposal seems to be to avoid the collision of the head against the windscreen, rather than to cushion the impact of the body of the pedestrian on the bonnet or on the mudguards of the car.

Essential purpose of this invention is also to avoid the abovementioned drawbacks.

BRIEF SUMMARY OF THE INVENTION

This and other aims are attained with the present innovation according to the characteristics which are included in the attached claims, solving the arising problems by means of a structure for the front of a vehicle, of the type with deformation control for the safeguard of pedestrians, cooperating with sensors in order to detect or anticipate the impact and including at least one air bag placed below the bonnet component, and a "soft nose" shape of the front part of the vehicle, the structure of which is composed of at least one front module, of the interchangeable type, being pre-assembled and constructed from a thermoplastic material that includes the motor bonnet covering, the bumper covering and the covering of the mudguards, respectively left and right side, said module is pre-assembled in correspondence to the front side resulting hinged to the underside of the front of the vehicle, and on which at least one side is deformable or raisable, maintaining the rear portion coupled, by air bags placed under said module that interacts with said sensors.

Advantages

In this way, some advantages are achieved through the considerable creative contribution, the effect of which constitutes an immediate technical progress.

A first object is to further reduce the injuries received by a pedestrian in the event of a collision with a vehicle. This is substantially due to the fact that the same pre-assembled module, in an active condition, provides the surface of impact with a cushioning function against which, after the collision, the pedestrian is laid across. In more detail, the best position that said pre-assembled module assumes, while anticipating the impact, with a slightly inclined position and away from the underlying load-bearing structure, as well as being held up uniformly by the air bags placed below said module, helps the fast dispersal of the accumulated energy. Furthermore, it can be observed that the reduction of injuries is also to be considered as a positive consequence of the increase in the front lateral surface of the vehicle that is structured in such way so as to absorb the impact.

A second object consists of reducing the damages incurred by the vehicle in case of impacts with small entities.

A third object consists of avoiding the need of significant aesthetic changes.

A fourth object is to constitute a valid and more economic alternative in the event of restoring the front of the vehicle, after the accident has occurred.

Further objects, particularly for the automotive industry, are to be found in:

- the conformity with the pedestrian collision law;
- the possibility of installation on the "newly registered" cars;
- the reduction of overall final costs due partly to the advantages deriving from the pre-assembly, partly to the lower cost of the system with regards to the previous ones, partly to the easiness of the final in-line assembly and finally, partly due to the reduction of the problems concerning damages during the transportation and the assembly; and
- weight and noise reduction.

These, and other objects and advantages will be apparent by the following specific description of some preferred embodiments, with the aid of the attached schematic drawings whose details are not to be considered restrictive but only illustrative.

BRIEF DESCRIPTION OF THE SEVERAL VIEWS OF THE DRAWINGS

Finally.

DETAILED DESCRIPTION OF THE INVENTION

Figure 1:
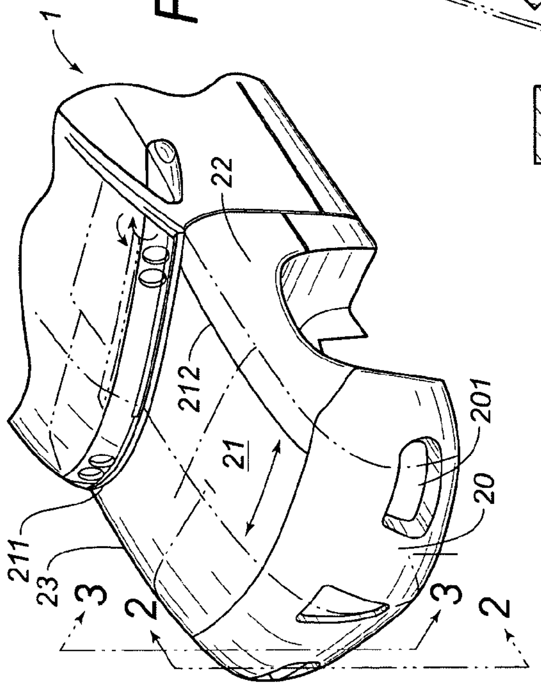
FIG. 1 is a perspective view of the front of a vehicle with a module made out of a thermoplastic material, pre-assembled, including the motor bonnet covering, the bumper covering and the covering of the mudguards, respectively left and right.
Figure 2:
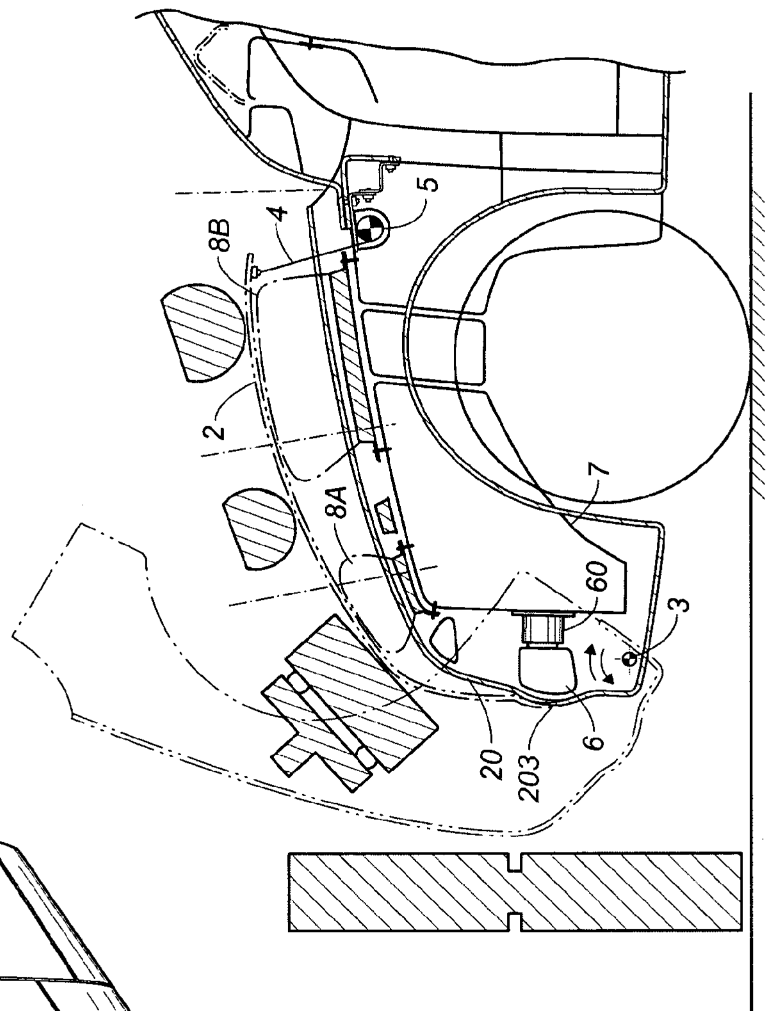
FIG. 2 is a sectional view according to the longitudinal surface A of the front of the vehicle of FIG. 1, which represents some of the possible conditions, respectively a module made from a thermoplastic material, pre-assembled-in a position of rest, in a position of impact and in an open position.
Figure 3:
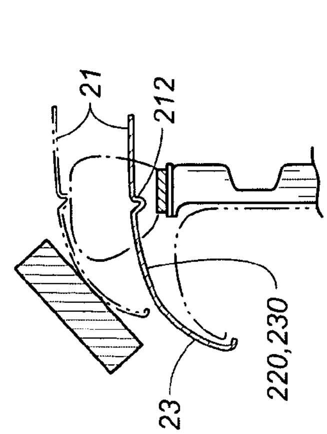
FIG. 3 is a sectional view, according to the transverse surface B of the front lateral part of the vehicle of FIG. 1.
Figure 4:
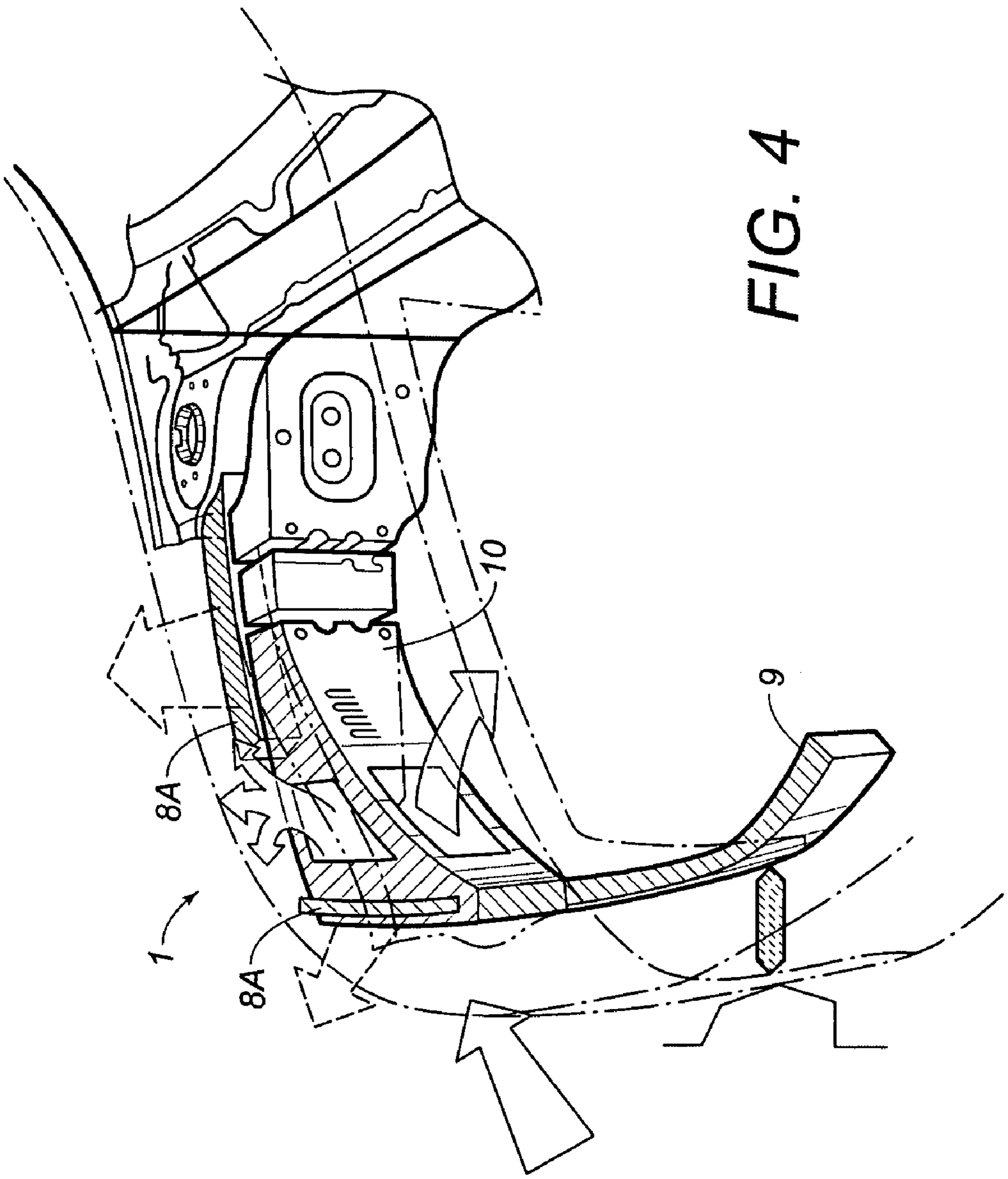
FIG. 4 is a perspective view of the structural part of the body underneath the pre-assembled module made from a thermoplastic material.
Figure 6:
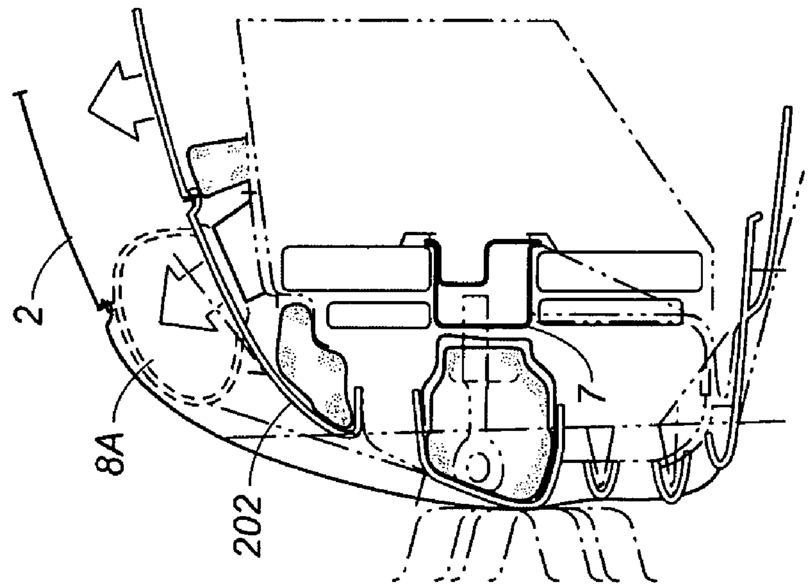
FIG. 6 represents a sectional view of the front zone of the vehicle, in which a second possible design of the body is illustrated.
Figure 5:
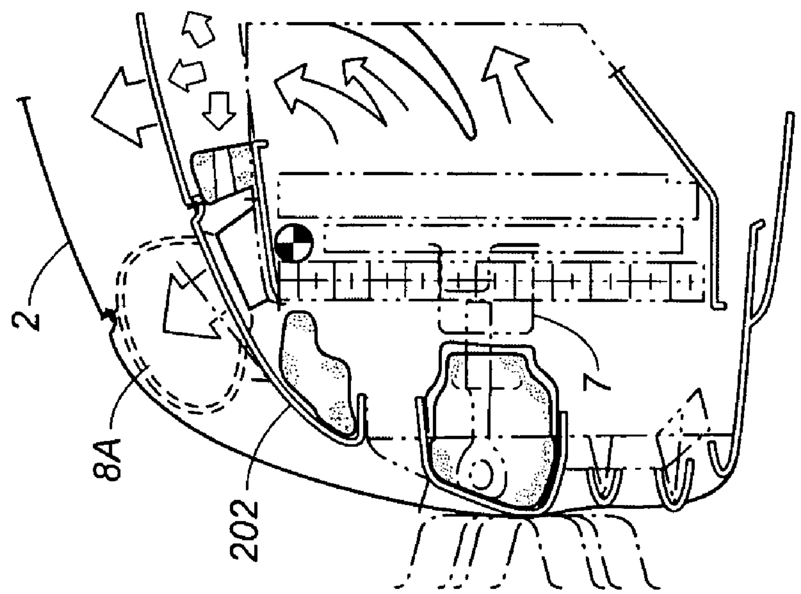
FIG. 5 represents a sectional view of the front zone of the vehicle, in which a first possible design of the modified body is illustrated.

Also with respect to the figures, it can be observed, firstly, that a vehicle 1, is of the type equipped with one or more sensors (not illustrated) having the purpose of detecting an approaching impact or an actual impact. Said sensors command the activation of a series of air bags 8A and 8B, which, in order to be unfolded, are placed in the front of the vehicle 1 and immediately below with regards to a front module 2 that includes the covering of the bonnet.

In more detail, said front module 2 is of the pre-assembled type, constructed by steadily joining between them at least four covering members made from a thermoplastic material. Said module 2 is therefore achieved by assembling the bumper covering 20, the motor bonnet covering 21, the left mudguard covering 22 and the right mudguard covering 23. With respect to the bumper covering 20, which stretches out transversely along the front side of the vehicle, this is a component, shaped with rounded lines, that encompasses, centrally, the area of the grid 200 with the area of the headlights 201 at both ends on each side. The portion of the bumper covering 20 includes an upper part 202 that, turned-up towards the rear part of the vehicle 1, extends with correspondence to the engine bay, so far as to join with the front border 210 of the motor bonnet covering 21. Regarding the motor bonnet covering 21, being slightly convex, it extends along lengthways, ending with the border 211, from the connection with the bumper covering 20 almost up to the base of the windscreen of the vehicle 1. Finally, both the left mudguard 22 and the right mudguard 23, include the relative wheel arch, and an upper part 220, 230 that, each one turned up above the corresponding wheel arch, is to join to the corresponding side end 212 of the motor bonnet covering 21.

Since the pre-assembled module 2, should be capable of being raised, on one side so as to allow the access to the engine bay, on the other as a reaction in the case of a hypothetical impact, in correspondence with the bumper covering 20 and below the pronounced shape 203 that defines the protrusion of the bumper, is laterally foreseen, at least one point for the hinging 3. In that way, the pre-assembled module 2 can therefore rotate forward, raising only the rear part, while the front remains hinged on 3. To allow the coupling of the pre-assembled module 2 to the vehicle, and so that it remains in a closed position until a control intervenes to determine its disengagement, in the rear part, in correspondence with the border, 211 a belt 4 is foreseen. In this case, at the moment of the closing of the pre-assembled module 2, the hinge binds to the lock connected to the pre-tensioner 5.

Regarding the area under the pre-assembled module 2 and in correspondence with the front part of the body of the vehicle, a cooperating support structure is foreseen, made up with a crossbeam 6. Said crossbeam 6 is placed, in the illustrated example, in a retracted position with regards to usual solutions, providing greater space for absorbing energy with the possibility of varying the profile during the collision and of providing greater protection to the radiators, which in this case are divided. The crossbeam 6 always bears a dissipater or absorber of energy 60 in correspondence to the front side, which is to be partially covered by the shape of the bumpers covering 20 of the pre-assembled module 2.

Finally, a funnel-shaped type strut 7 cooperates with said crossbeam 6 in stiffening the body.

Regarding the air bags 8A and 8B, more than one is foreseen. In more detail, in one case, said air bags 8A and 8B can be housed under a structural complex that includes an axle crossbeam 9. In this case, the first air bags 8A of the front lateral type are placed along the front end of said axle crossbeam 9, while the second set of vertical lateral type air bags, 8B are placed to the sides of said axle crossbeam 9 set to a strut 10.

Receiving the impulse from said sensors that detect the impact, air bags 8A and 8B expand, forcing upwards said pre-assembled module 2 made from a thermoplastic material. In this case, the rear portion of the preassembled module 2, made from a thermoplastic material, tends to move away from the border 211 of the body, however, without uncoupling. This condition, in this case, is substantially controlled by the belt 4 that, by means of the pre-tensioner 5, limits the upward trajectory of the rear portion of the module 2 made from a thermoplastic material.

I claim:

1. A structure for a front of a vehicle for safeguard of pedestrians, the structure comprising:

a hood component;

at least one air bag positioned below said head component, the air bag being expandable in a direction toward an underside of said hood component;

a nose component formed of a soft material, said nose component suitable for affixing to a front of the vehicle;

a pre-assembled frontal module formed of a thermoplastic material, said frontal module comprising:

a hood covering positioned over said hood component;

a bumper covering having an edge connected to said hood covering and extending over said nose component;

a pair of mudguard coverings connected to said hood covering and suitable for extending over left and right mudguards of the vehicle, said pre-assembled module hingedly affixable to the front of the vehicle.

2. The structure of claim 1, said pre-assembled frontal module being deformable on at least one side thereof, the air bag positioned to raise said frontal module when inflated.

3. The structure of claim 1, the air bag comprising:

a set of front lateral type air bags positioned adjacent said hood covering; and a set of vertical lateral type air bags positioned adjacent said pair of mudguard coverings.

4. The structure of claim 1, said pre-assembled frontal module having a rear at a forward edge of said hood covering, the structure further comprising:

a belt extending over said hood covering;

a pre-tensioner means receiving said belt for maintaining said belt in tension over said hood component; and a lock means connected to said belt for releasing said belt from said pre-tensioner means.

5. The structure of claim 1, further comprising:

a crossbeam extending behind said bumper covering, said crossbeam having a dissipater surface at least partially covered by said bumper covering.

6. The structure of claim 5, further comprising:

a funnel-shaped strut cooperative with said crossbeam.

7. The structure of claim 1, said bumper covering having openings formed on opposite sides thereof suitable for exposing respective headlights of the vehicle, said bumper covering having an upper part turned so as to extend rearwardly therefrom, said upper part joined to said hood covering.

8. The structure of claim 1, said hood covering having a rear border suitable for positioning adjacent a base of a windscreen of the vehicle.

9. The structure of claim 1, each of said pair of mudguard coverings having a wheel arch formed therein and an upper edge joined to a respective side of said hood covering.

* * * * *